(12) United States Patent
Rossegger et al.

(10) Patent No.: US 7,872,380 B2
(45) Date of Patent: Jan. 18, 2011

(54) APPARATUS AND METHOD FOR GENERATING ROTARY OSCILLATIONS

(75) Inventors: Wilfried Rossegger, Graz (AT); Karl Baumgartner, Graz (AT)

(73) Assignee: Kristl, Seibt & Co. Gesellschaft M.B.H., Graz (AT)

( * ) Notice: Subject to any disclaimer, the term of this patent is extended or adjusted under 35 U.S.C. 154(b) by 316 days.

(21) Appl. No.: 12/281,351

(22) PCT Filed: Mar. 1, 2007

(86) PCT No.: PCT/AT2007/000105

§ 371 (c)(1),
(2), (4) Date: Sep. 2, 2008

(87) PCT Pub. No.: WO2007/098521

PCT Pub. Date: Sep. 7, 2007

(65) Prior Publication Data

US 2009/0015087 A1     Jan. 15, 2009

(30) Foreign Application Priority Data

Mar. 3, 2006   (AT) ............................... A 364/2006

(51) Int. Cl.
*H02K 1/22* (2006.01)
*H02K 33/00* (2006.01)
*H02K 35/00* (2006.01)

(52) U.S. Cl. ..................... 310/36; 310/92; 310/114; 310/266

(58) Field of Classification Search ............... 310/36, 310/92, 114, 266; *H02K 1/22, 33/00, 35/00*
See application file for complete search history.

(56) References Cited

U.S. PATENT DOCUMENTS

| 2,896,101 | A | * | 7/1959 | Laskin ................ 310/171 |
| 3,569,782 | A | * | 3/1971 | Salihi et al. ............ 361/243 |
| 3,772,913 | A |   | 11/1973 | Zell et al. |
| 4,283,957 | A |   | 8/1981 | Zobrist et al. |
| 4,651,040 | A | * | 3/1987 | Gerstner et al. ......... 310/166 |
| 4,654,577 | A | * | 3/1987 | Howard ............... 322/28 |
| 5,506,460 | A | * | 4/1996 | Steinhart et al. ........ 310/112 |
| 6,209,692 | B1 | * | 4/2001 | Pels et al. .............. 188/381 |
| 2009/0015087 | A1 | * | 1/2009 | Rossegger et al. ........ 310/92 |

FOREIGN PATENT DOCUMENTS

DE     537 551     11/1931

(Continued)

OTHER PUBLICATIONS

International Search Report: PCT/AT2007/000105.

*Primary Examiner*—Quyen Leung
*Assistant Examiner*—John K Kim
(74) *Attorney, Agent, or Firm*—Ladas & Parry LLP (57) ABSTRACT

An apparatus and method for generating rotary oscillation with two shafts pivotable relative to each other. An end section of a first shaft is accommodated in an end section of a second shaft so as to form an air gap. One of the two shafts has a magnetic field generator of substantially constant field strength, and the other shaft has conductors which generate a magnetic field and to which current has been variably applied to pivot the shafts relative to each other.

21 Claims, 6 Drawing Sheets

FOREIGN PATENT DOCUMENTS

| | | |
|---|---|---|
| DE | 974 497 | 1/1961 |
| DE | 20 57 347 A1 | 5/1972 |
| FR | 1 452 601 A | 4/1966 |
| JP | 2003-126776 A | 5/2003 |
| WO | 03/047076 A1 | 6/2003 |
| WO | 2005/064776 A1 | 6/2005 |

* cited by examiner

APPARATUS AND METHOD FOR GENERATING ROTARY OSCILLATIONS

BACKGROUND OF THE INVENTION

The invention relates to an apparatus for generating rotary oscillations with two shafts pivotable relative to each other, wherein an end section of a first shaft is accommodated in an end section of a second shaft so as to form an air gap. Furthermore, the invention relates to a method for generating rotary oscillations.

The providing of rotary oscillations, i.e. timely varying rotary movements, is necessary for different applications, in particular in the fields of checking machines, devices and machine parts, which are subjected to a rotary movement.

Different apparatuses for generating rotary oscillations have already been known from the prior art. These are particularly apparatuses, wherein a constant rotary movement is superposed by a modulated pressurisation of a hydraulic coupling so that the sum of the two rotary movements will be provided at the outlet. Such pressure-modulated hydraulic couplings have been known, e.g. from DE 2 057 347 A, U.S. Pat. No. 4,283,957 A and U.S. Pat. No. 3,772,913 A. However, by means of such pressure-modulated hydraulic couplings only frequencies of up to 800 Hz at the most can be achieved due to the compressibility of the hydraulic fluid.

A different apparatus has been known from JP 2003126776 A, wherein two stationary magnets are provided which are fed by a direct-current source. Thus, such an apparatus only allows for generation of a torsion oscillation about a fixed zero position.

Furthermore, it has also already been known to generate rotary oscillations by means of electric machines. Here, a rotor of an electric machine is co-rotated with an electric rotary field, wherein both a basic rotation and a rotational uniformity are provided for achieving the rotary oscillations desired in the rotary field. In order to be able to keep the moment of inertia of the rotor low, synchronising machines are used in general. However, with such machines only rotary accelerations of up to 12,000 rad/s$^2$ at the most can be achieved in the unstressed condition. If such machines are stressed with a test specimen for testing purposes, which has a moment of inertia of, e.g., about 0.1 kgm$^2$, only rotary accelerations of up to 4,000 rad/s$^2$ can be achieved with such synchronising machines.

It is an object of the present invention to create an apparatus for generating rotary oscillations, by means of which high-frequency rotary oscillations, in particular rotary accelerations of more than 10,000 rad/s$^2$, can be generated in a simple manner.

This is achieved by an apparatus of the initially defined kind in that one of the two shafts comprises means for generating a magnetic field of substantially constant field strength, and the other shaft comprises conductors which generate a magnetic field, wherein current can be variably applied to said conductors for pivoting the shafts relative to each other. Compared to the synchronising machines known, high rotary accelerations of more than 10,000 rad/s$^2$, in particular of more than 40,000 rad/s$^2$, can be achieved in a simple manner by arranging the two shaft sections into one another and by generating a magnetic field by the aid of one of the two shafts, which magnetic field is timely substantially constant in strength and which, for generating a rotary oscillation movement, is superposed by the magnetic field generated by the conductors, to which current has been variably applied. Here, the field strength of the magnetic field, which is of substantially constant strength, may also be subject to certain changes, but these changes are smaller than those in the field strength of the magnetic field generated by the conductors, to which current has been variably applied.

For generating a magnetic field of substantially constant strength, by means of one of the two shafts, it is beneficial if conductors connected to a current source are provided as means for generating a magnetic field of substantially constant field strength. The magnetic field of timely substantially constant strength may be designed to be spatially constant or spatially rotating with respect to the shaft generating the magnetic field. For creating a magnetic field which spatially rotates with respect to the shaft generating the magnetic field, the conductors for generating the magnetic field of substantially constant field strength may be designed as multi-phase windings. Alternatively, it is also possible to provide permanent magnets as means for generating a constant magnetic field.

For checking machine parts which are subjected to rotary stress, it is advantageous if the two shafts are mounted in a freely rotatable manner, wherein the shaft designed as an input shaft is driven. Here, the input shaft is usually driven at a substantially constant number of revolutions such that the two shafts rotate at a substantially constant number of revolutions due to the magnetic field of substantially constant field strength; yet, for generating rotary oscillations, the magnetic field of substantially constant field strength may be superposed by a varying magnetic field by the aid of the conductor to which current can be applied variably, thus putting the drive shaft into rotary oscillation as a function of the variably applied current. With a special design of the apparatus, the input shaft may also be designed to be torque-proof and only the output shaft be rotatably mounted.

For driving the input shaft, it is beneficial if the input shaft is directly connected with a drive shaft of a driving unit, in particular of an electric motor. Alternatively, for driving the input shaft, it would also be conceivable to connect the input shaft with a drive shaft of a driving unit, in particular of an electric motor, via a torque-transmission device, e.g. via a drive belt.

As to an efficient transmission of the magnetic forces acting in the area of the shafts arranged one into another, it is advantageous if one of the shafts comprises an annular gap so as to form an air gap and for accommodating a cylindrical hollow-shaft section of the other shaft. Furthermore, as to an efficient transmission of forces, it is advantageous if the means for generating a magnetic field of substantially constant field strength, or the conductors, are arranged in the part of the shaft that is provided radially outside the annular gap. Here, it is particular beneficial if the input shaft comprises the annular gap for accommodating the cylindrical hollow-shaft section of the output shaft. Certainly, the annular gap could also be provided in the output shaft, a hollow-shaft section of the input shaft being accommodated by said annular gap.

In order to keep the moment of inertia of the shaft comprising the annular gap low, it is beneficial if the rotatable part arranged radially outside the annular gap is surrounded by a torque-proof stator so that the outer part of the shaft can be designed to be comparably thin-walled. Here, the magnetic flow may be guided from the outer part of the shaft into the stator via an air gap.

Moreover, it is preferred that the input shaft comprises the means for generating a magnetic field of substantially constant field strength and that the output shaft comprises the conductor windings to which current may be applied variably. Yet, it is also possible to generate a magnetic field of substantially constant field strength by means of the output shaft and to generate a timely varying magnetic field by means of the input shaft for generating rotary oscillations.

In order to be able to achieve as high a rotary acceleration as possible by means of the apparatus also at high frequencies, it is beneficial if a cage winding is arranged in the air gap between the two shafts. By the measure of providing a cage winding, inductance of the conductors generating a timely variable magnetic field can be kept low, thus achieving comparably high values of rotary acceleration. In case that one of the two shafts comprises an annular gap for accommodating a hollow-shaft section of the other shaft, it is advantageous with respect to achieving rotary accelerations as high as possible if one cage winding each is provided on either side of the hollow-shaft section of the one shaft accommodated in the annular gap of the other shaft.

Furthermore, for achieving rotary accelerations as high as possible, it is advantageous if the conductor windings are designed to be waveguides or supra-conductors. Here, for cooling the waveguides, it is beneficial if a cooling medium flows through the waveguides.

In order to generate rotary oscillations, wherein the two shafts are pivoted relative to each other by up to ±20°, it is advantageous if the conductors, to which current has been variably applied, are divided into several segments on the shaft, said segments being arranged circumferentially in an even manner and preferably being four, wherein the sections between the conductor segments do not comprise conductors.

In order to achieve a deflection of the two shafts relative to each other in both directions, it is advantageous according to the inventive method if the conductors are fed with alternating current.

Tests have shown that it is advantageous for achieving the desired rotary accelerations of from 10,0000 rad/s$^2$ to 40,000 rad/s$^2$ if alternating current at a frequency of between 0 and 4,000 Hz, preferably of substantially 400 Hz, is applied to the conductors. Likewise, it is beneficial for achieving the desired rotary accelerations if a current strength of between 300 and 2,000 amp, preferably of from 400 to 1800 amp, and a voltage of between 30 and 250 volts, preferably of from 50 to 190 volts, are applied variably to the conductors.

For checking an output-shaft-connected test specimen with regard to its stress capacity on rotary oscillations, it is advantageous if during the application of current to the conductors and during superposition of the magnet field resulting therefrom, the two shafts oscillate relative to each other at a frequency of from 0 to 4,000 Hz, preferably of substantially 400 Hz.

In the following, the invention will be explained in even more detail by way of preferred embodiments illustrated in the drawings, yet without being restricted thereto.

DETAILED DESCRIPTION OF THE PREFERRED EMBODIMENTS

Figure 1:
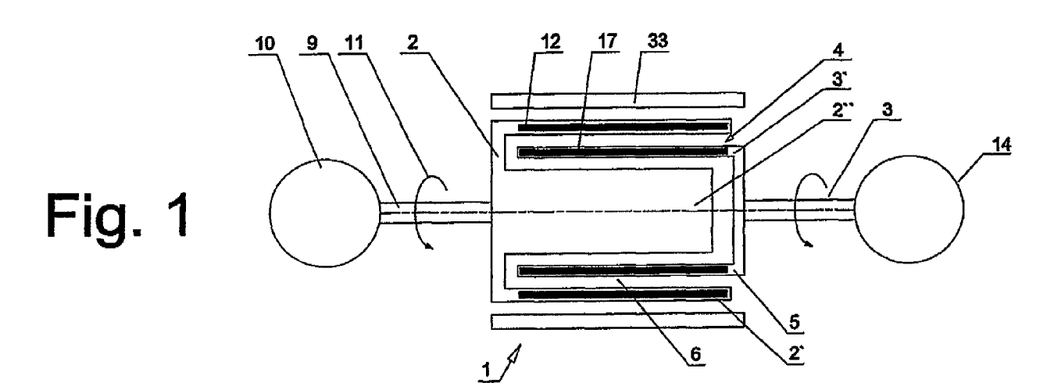
FIG. 1 is a schematic view of an apparatus for generating rotary oscillations by means of an input shaft directly connected with an electric motor.

FIG. 1 shows an apparatus 1 for generating rotary oscillations with an input shaft 2 and an output shaft 3 arranged pivotably relative to each other. Here, the input shaft 2 comprises an annular gap 4, in which a hollow-shaft section 3' of the output shaft 3 is accommodated so as to form an air gap 6. Accordingly, the input shaft 2 is composed of an external rotor 21 and an internal rotor 2", wherein the external rotor 2' is enclosed by a stator 33 into which the magnetic flow is fed from the external rotor 2' via an air gap. Due to this measure the external rotor 2' can be designed to be thin-walled, thus allowing for the moment of inertia of the external rotor to be advantageously kept low. Of course, it would also be conceivable to omit the internal rotor 2" and to design the hollow-shaft section 3' of the output shaft 3 to be massive.

Figure 6:
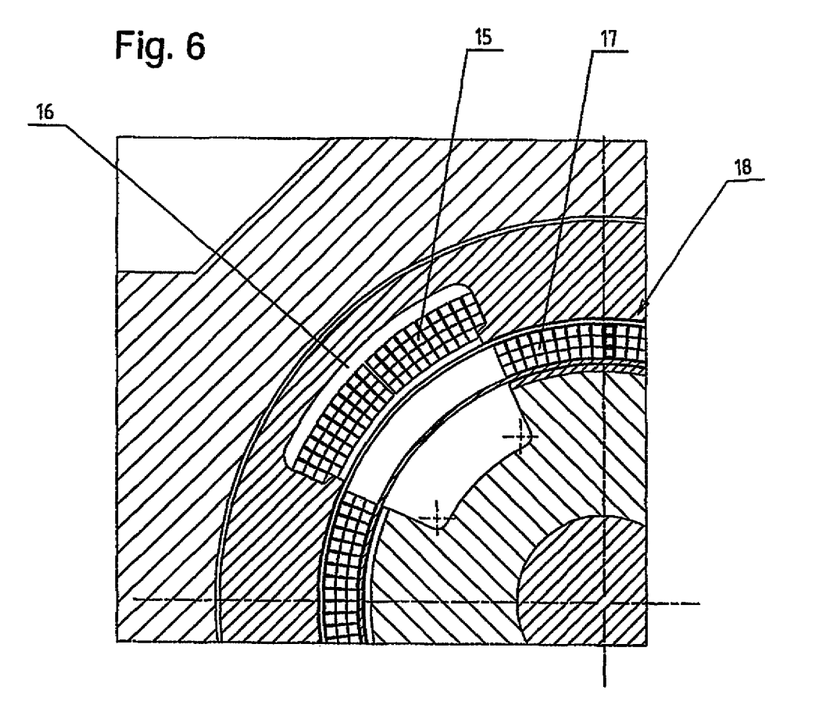
FIG. 6 is a sectional detailed representation of an annular gap of the input shaft, with a section of the output shaft being accommodated.

In the exemplary embodiment shown in FIG. 1, the input shaft 2 is directly connected with a drive shaft 9 of an electric motor 10 via which the input shaft 2 is rotated in the rotary direction 11 at a substantially constant number of revolutions. Here, schematically illustrated means 12 are arranged in the external rotor 2' of the input shaft 2 via which a substantially constant magnetic field is generated. In the exemplary embodiment shown, waveguides 15 fed by a direct-current source are provided as means 12 for generating a substantially constant magnetic field (cf. FIGS. 3 and 6); yet, also permanent magnets may be provided in the external rotor 21 as an alternative to the waveguides 15.

In the hollow-shaft section 3' of the output shaft 3 arranged in the annular gap 4 waveguides 17 are provided through which a timely varying current of a current strength of about 1,500 amp and a voltage of about 200 volts flow so as to cause a rotary acceleration between the shafts 2 and 3 by means of the magnetic force generated in the waveguides 17 through which current flows, thus achieving the desired high-frequency rotary oscillations of up to 4,000 Hz. A test specimen 14 is connected to the output shaft 3, thus being subjected to the rotary oscillations of the output shaft 3.

Figure 2:
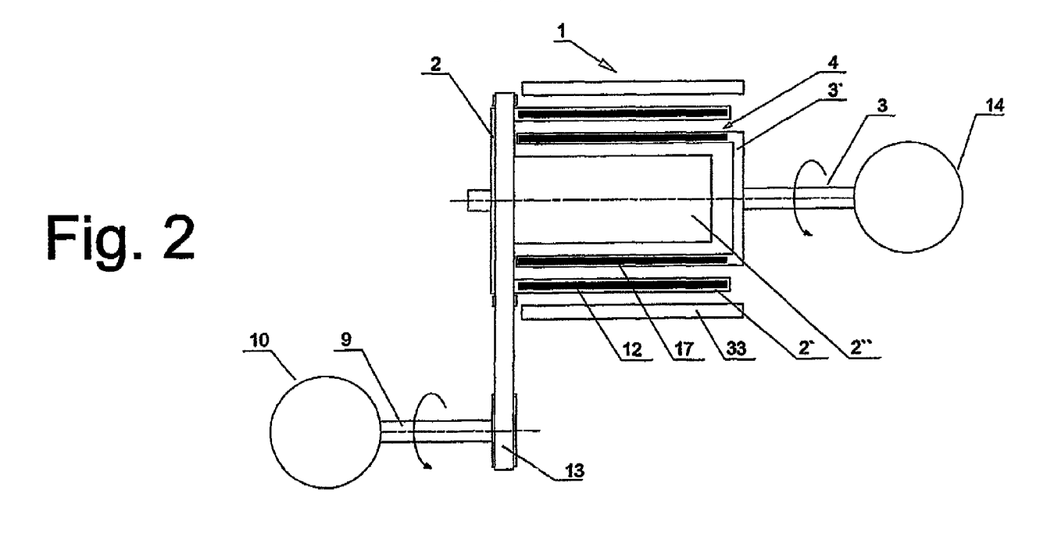
FIG. 2 is a schematic view of an apparatus for generating rotary oscillations, wherein the input shaft is coupled to an electric motor via a drive belt.

FIG. 2 shows an electrodynamic apparatus 1 of substantially the same structure for generating rotary oscillations with an input shaft 2 which comprises an annular gap 4 for accommodating a hollow-shaft section 3' of the output shaft 3 to which a test specimen 14 is connected. Moreover, also in this case the means 12 for generating a substantially constant magnetic field are accommodated by the external rotor 2' of the input shaft 2 surrounding the hollow-shaft section 3', and conductor windings 17 for generating a timely varying magnetic field are arranged in the hollow-shaft section 3'. The only difference to the exemplary embodiment schematically show in FIG. 1 is that the input shaft 2 is not directly driven by the electric motor 10 but a drive belt 13 is provided between the drive shaft 9 of the electric motor 10 and the input shaft 2 to transmit the moment of inertia. Of course, also in this case the means 12 for generating a constant magnetic field and the conductors 17 for generating a timely varying magnetic field could be provided in a reverse order in the input and output shafts or the input shaft 2 may be arranged in an annular gap of the output shaft 3.

Figure 3:
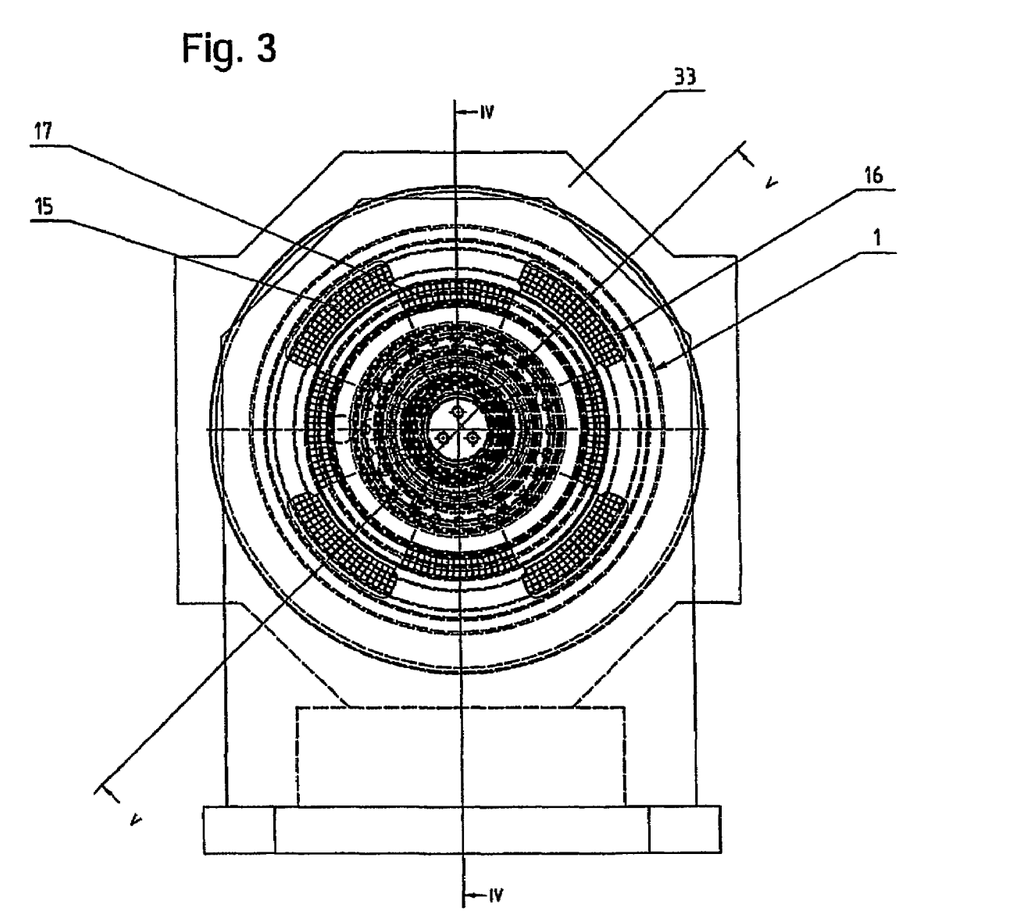
FIG. 3 is a view of the apparatus for generating rotary oscillations.
Figure 4:
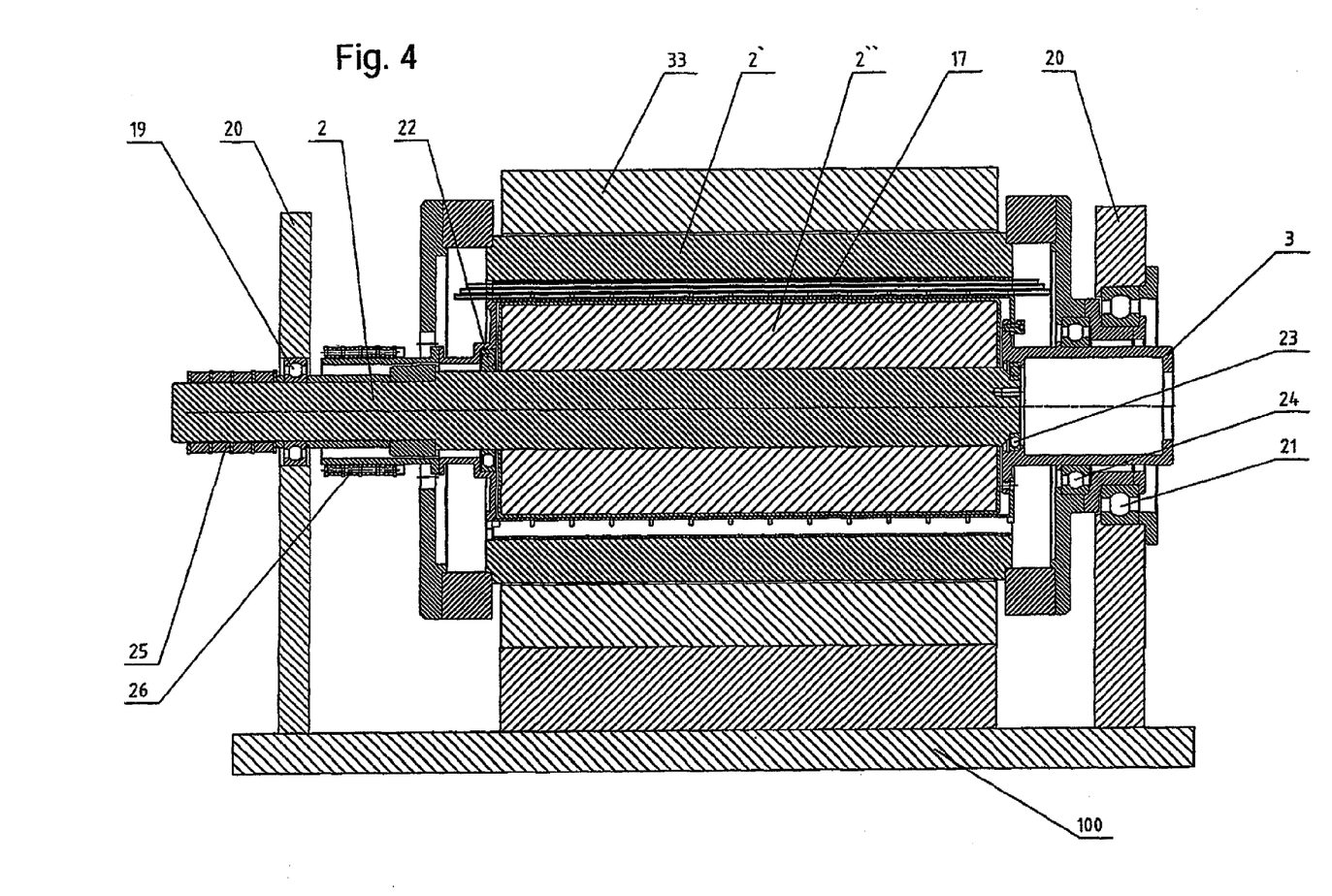
FIG. 4 is a section along line IV-IV in FIG. 3.
Figure 5:
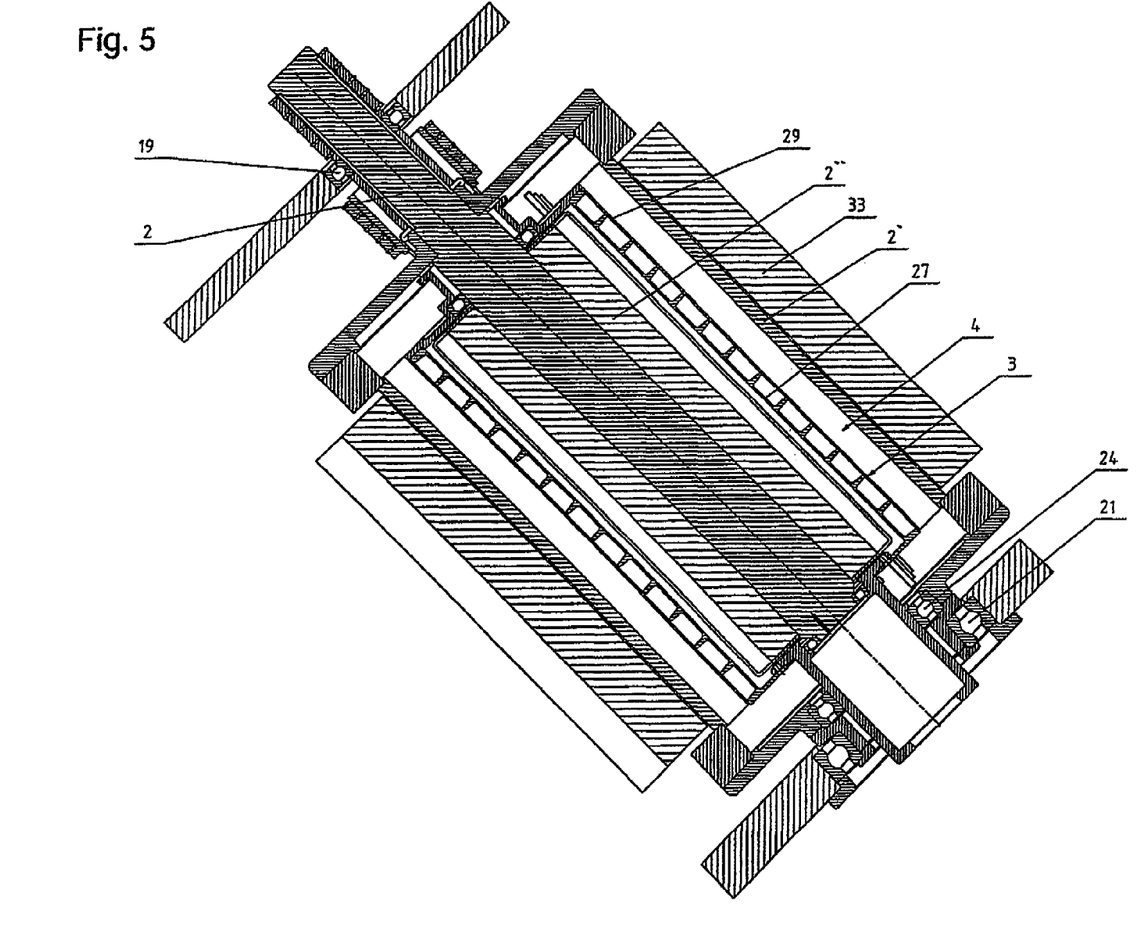
FIG. 5 is a section along line V-V in FIG. 3.

FIG. 3 shows a view of the electrodynamic apparatus 1 for generating rotary oscillations, wherein it is particularly apparent that the conductors 15 are evenly distributed across the periphery of the external rotor 2' of the input shaft 2 in four segments 16 (cf. FIGS. 4 and 5). For this purpose, in the central position of the shafts 2, 3 arranged pivotably relative to each other (shown in FIGS. 3 and 6), conductors 17 are provided offset in four circle-segment-type sections 18 and carried by the output shaft 3.

In FIG. 4, the pivotable mounting of the input shaft 2 and the output shaft 3 is particularly apparent. Here, the input shaft 2 is pivotally mounted in a bearing casing 20 via a bearing means 19. Moreover, the whole assembly is pivotally mounted in the bearing casing 20 via a bearing 21. The output shaft 3 is mounted relative to the internal rotor 2" of the input shaft 2 via bearings 22 and 23 and relative to the external rotor 2' of the input shaft 2 via a bearing 24. If the input shaft 2 is torque-proof, the bearings 19 and 21 may be omitted.

Additionally, slip rings 25 provided on the input shaft 2 can be seen in FIG. 4, via which waveguides 15 are supplied with current by means of a direct-current source for generating a substantially constant magnetic field.

Furthermore, slip rings 26 provided on the output shaft 3 can be seen, via which current is variably applied to the waveguides 17 so that the output shaft 3 is put into rotary oscillation due to the magnetic fields superposing each other. Alternatively, the slip rings 26 may also be provided on the input shaft 2 and connected with the waveguides 17 via flexible conductors.

Figure 7:
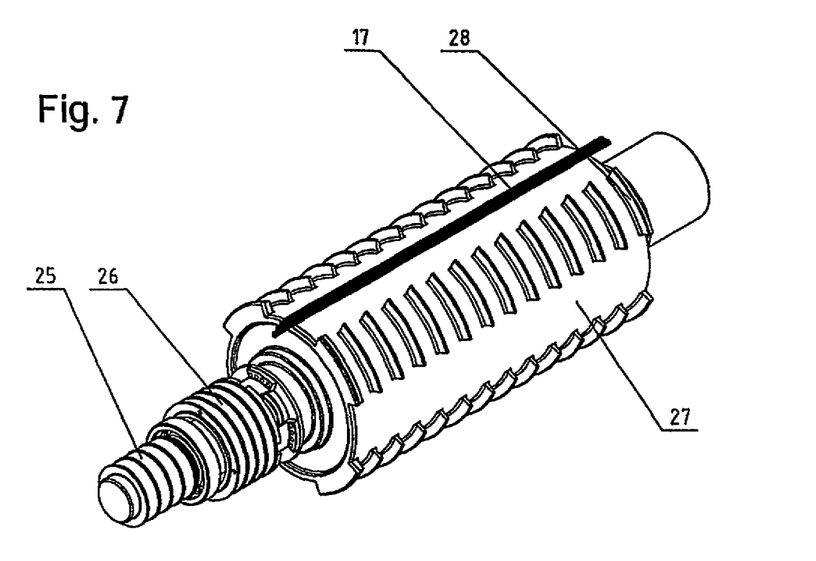
FIG. 7 is a perspective view of a fibre-reinforced casing of an output shaft of the apparatus.

From the sectional representation of FIG. 5 and the perspective view of FIG. 7, the structure of the output shaft 3 is particularly apparent. Here, a casing 27 made of fibre-reinforced material, e.g. carbon, is provided which comprises radially projecting supports 28 spaced in the longitudinal direction and divided into four segments, between which the waveguides 17 are arranged and which, thus, serve as a torsional support for the waveguides 17. Moreover, the output shaft 3 comprises an external casing 29 for accommodating the waveguides 17, said casing also being made of fibre-reinforced material. Alternatively, the output shaft 3 may also be designed with no casing 27, 29 and be a self-supporting conductor-construction, with the conductors 17 being connected with each other in a self-supporting fashion (e.g. glued).

Figure 8:
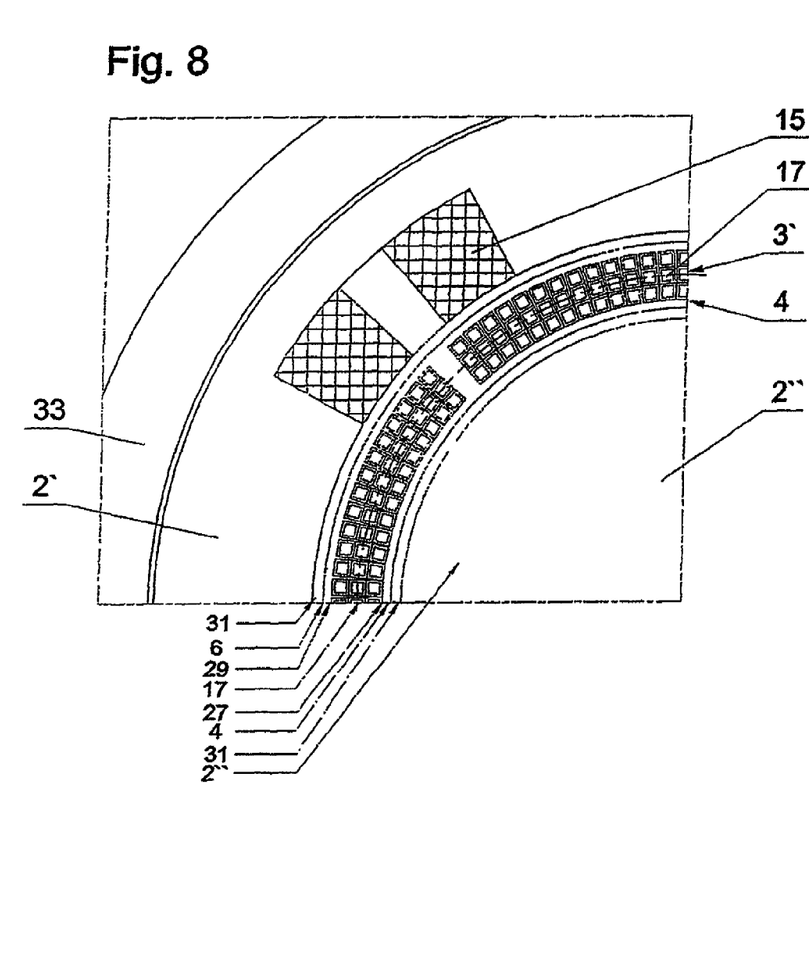
FIG. 8 shows the transition area between input and output shaft in detail.

FIG. 8 shows a detailed view of the annular gap 4 which accommodates the hollow-shaft section 3' of the output shaft 3. From the exemplary embodiment, which has only slightly been modified compared to FIG. 6, it is particularly apparent that as electric conductors 17 that generate a timely varying magnetic field waveguides are provided which are preferably made of aluminum and through which a gaseous or liquid medium flows for cooling purposes. Here, the waveguides 17 are accommodated in several, e.g. in three, layers between the internal casing 27 and the external casing 29. Moreover, one cage winding 31 each is provided in the air gap 6 between the internal rotor 2" and the external rotor 2' of the input shaft 2 in a radial manner inside and outside of the conductors 17 so as to keep the inductance of the conductors low, thus allowing for as high a rotary acceleration as possible to be achieved by means of the apparatus 1 even at high frequencies.

Figure 9:
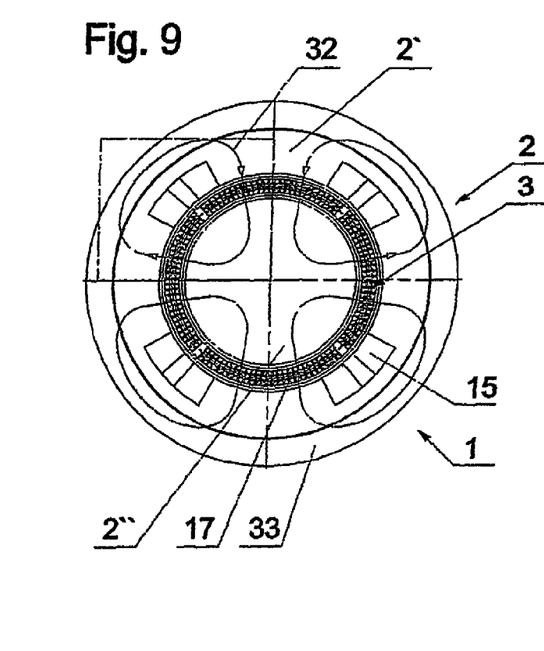
FIG. 9 is a view of the apparatus with a schematically outlined magnetic field.

FIG. 9 is a more schematic representation of the apparatus 1 in a central position of the shafts 2 and 3 arranged pivotably relative to each other, wherein the flow of the magnetic field, which is generated by the conductors 15 of the input shaft 2 and which is of timely substantially constant field strength, is schematically illustrated by magnetic-field lines 32. The magnetic flow flows from the external rotor 2' via the air gap 6 and/or the internal rotor 2" back to the external rotor 2' via the air gap, then flows into the stator 33 and again back into the external rotor 2'. In order to keep possible losses of eddy current as small as possible, the stator 33 is laminated. If current is variably applied to the conductors 17, the magnetic field 32 will be superposed by the magnetic field generated by the conductors 17, thus causing the output shaft 3 to pivot relative to the input shaft 2 by about ±20°. Here, a current strength of from about 300 to 2,000 amp and a voltage of from about 30 to 250 volts are usually applied to the conductors 17, wherein the rotary accelerations of about 30,000 rad/s$^2$ can be achieved by rotary oscillations at a frequency of about 4 kHz and with a test specimen having a moment of inertia of about 0.2 kgm$^2$.

The specific design of the output and/or input shaft may be different than in the exemplary embodiment shown, and the decision as to which of the two shafts generates a magnetic field of timely substantially constant strength and which a variable magnetic fields may also be a different one. The only essential thing is that a magnetic field of timely substantially constant field strength will be superposed by a timely varying magnetic field so as to generate rotary accelerations between the two shafts arranged pivotably relative to each other.

The invention claimed is:

1. An apparatus for generating rotary oscillations with two shafts pivotable relative to each other, wherein an end section of a first shaft is accommodated in an end section of a second shaft so as to form an air gap, wherein one of the two shafts comprises means for generating a magnetic field of substantially constant field strength, and that the other shaft comprises conductors generating a magnetic field, wherein current can be variably applied to said conductors for pivoting the shafts relative to each other.

2. The apparatus according to claim 1, wherein conductors connected to a current source are provided as means for generating a magnetic field of substantially constant field strength.

3. The apparatus according to claim 1, wherein permanent magnets are provided as means for generating a magnetic field of constant field strength.

4. The apparatus according to claim 1, wherein the two shafts are mounted in a freely rotatable manner, wherein the shaft, which is designed as an input shaft, is driven.

5. The apparatus according to claim 4, wherein the input shaft is directly connected with a drive shaft of a drive unit, in particular of an electric motor.

6. The apparatus according to claim 4, wherein that input shaft is connected with a drive shaft of a drive unit, in particular of an electric motor, via a torque-transmission device.

7. The apparatus according to claim 1, wherein one of the two shafts has an annular gap for creating an air gap and for accommodating a cylindrical hollow-shaft section of the other shaft.

8. The apparatus according to claim 7, wherein the means for generating a magnetic field of substantially constant field strength, or the conductors, are arranged in the part of the shaft that is provided radially outside the annular gap.

9. The apparatus according to claim 7, wherein the input shaft comprises the annular gap for accommodating the cylindrical hollow-shaft section of the output shaft.

10. The apparatus according to claim 7, wherein the rotatable part arranged radially outside the annular gap is surrounded by a torque-proof stator.

11. The apparatus according to claim 4, wherein the input shaft comprises the means for generating a magnetic field of substantially constant field strength, and the output shaft comprises the conductors to which current can be variably applied.

12. The apparatus according to claim 1, wherein a cage winding is arranged in the air gap between the two shafts.

13. The apparatus according to claim 8, wherein one cage winding each is provided on either side of the hollow-shaft section of the one shaft accommodated in the annular gap of the other shaft.

14. The apparatus according to claim 1, wherein the conductors are designed as waveguides.

15. The apparatus according to claim 1, wherein the conductors are designed as supra-conductors.

16. The apparatus according to claim 14, wherein a cooling medium flows through the waveguides.

17. The apparatus according to claim 1, wherein the conductors variably applied with current are divided into several segments on the shaft, said segments being distributed peripherally in an even manner and preferably being four, wherein the sections between the conductor segments do not comprise conductors.

18. A method for generating rotary oscillations with an apparatus according to claim 1, wherein the conductors are fed with alternating current.

19. The method for generating rotary oscillations according to claim 18, wherein an alternating current at a frequency of between 0 and 4,000 Hz is applied to the conductors.

20. The method for generating rotary oscillations according to claim 18, wherein a current strength of between 300 and 2,000 amp, and a voltage of between 30 and 250 volts, , are applied variably to the conductors.

21. The method for generating rotary oscillations according to claim 18, wherein during the application of current to the conductors and during superposition of the magnetic fields resulting therefrom, the two shafts oscillate relative to each other at a frequency of from 0 to 4,000 Hz.

* * * * *